Patented June 26, 1928.

1,674,897

UNITED STATES PATENT OFFICE.

ALBERT GODEL, OF LAGNIEU, FRANCE, ASSIGNOR TO SOCIETE DE RECHERCHES & D'EXPLOITATIONS PETROLIFERES, OF PARIS, FRANCE, A FRENCH JOINT-STOCK COMPANY.

ABSORBENT CATALYZER.

No Drawing. Application filed December 8, 1925, Serial No. 74,174, and in France December 9, 1924.

This invention relates to an agglomerated product and process for its manufacture, this new industrial product possessing a high absorbent and catalytic power.

This product which may be of various forms, in particular in the from of granules, is essentially characterized by the fact that it consists of an agglomerated mass of absorbent charcoal, preferably covered with a coating to give the product mechanical strength such that it can be manipulated and utilized without causing waste and losses of material.

The coating of the product may be of any desired thickness, which allows of graduating the mechanical strength of the product at will without affecting its absorbent or catalytic properties.

The absorbent catalyzer thus constituted is capable of numerous industrial applications; it is particularly suited for carrying out the recuperation or separation of gases, volatile solvents, hydrocarbon vapours, benzol, gasoline, etc.

The new industrial product above mentioned can be manufactured in the following way:—the material to be agglomerated, absorbent charcoal, is reduced to an impalpable powder and mixed with an organic product such as saccharose, intended to produce by its subsequent carbonization as hereafter explained the hardening of the entire mass.

It may be advantageous to add to the mixture a salt such as ferric chloride intended to ensure the regularity of the carbonization.

The mixture, heated and moistened with water in the desired conditions for obtaining sufficient plasticity, is delivered in any desired form, in granules for example, or by pressing into small cylinders of a few millimetres diameter and length.

The masses thus obtained are carried into a rotary drier.

After drying, the small masses or granules are then coated with a film constituted by an organic body such as sugar, with or without the addition of a small proportion of active carbon in impalpable powder. For this purpose there may be utilized apparatus currently employed in the manufacture of pharmaceutical products.

This coating or film, after a subsequent calcination, constitutes around each mass or granule of agglomerated charcoal, a covering of carbon of greater hardness which protects it against external mechanical actions.

The small masses or granules thus prepared are then calcined at about 700° centigrade, preferably in luted refractory pots having a slight permeability to allow release of the gases evolved during the carbonization.

This calcination restores to the finished product the chemical activity formerly possessed by the absorbent powder utilized, while giving it a superficial hardness and therefore considerable strength.

If there had been mixed with the paste to be agglomerated, a salt such as ferric chloride it would be necessary to wash the granules with hydrochloric acid and then with water after calcination.

As a result of this method of manufacture, it is possible to obtain a product of which the activity increases from the periphery towards the center, and in which the hardness increases on the contrary from the center towards the periphery.

For certain applications, not necessitating the use of a product of very high absorbent power, it will be possible to obtain with the process described absorbent masses of sufficient strength from the mechanical point of view, without having recourse to the coating operation, all the other operations being carried out as indicated.

The agglomerated carbon products made according to the process above described, and capable of numerous applications as absorbents, de-colorizers, catalyzers, etc., do not suffer any loss by the carrying away of powder or dust or by wear, this being due to their great superficial hardness.

These products are particularly intended for the extraction of hydrocarbon vapours contained in gases; for the purification of certain gases from objectionable elements or substances adapted to be retained in the product; for use as catalyzer in chemical reactions; for the application as decolorizer, etc.

Among the numerous applications to which the new product is suited, there may be mentioned by way of examples the extraction of benzol from coal gas and of gasoline from natural gas. It will also serve for eliminating traces of hydrochloric acid in certain processes for the manufacture of chlorine; for the purification of gases containing hydrosulfuric acid, etc. Moreover, it is applicable to various syntheses, like that of methyl chloride from chlorine and methane, and similar purposes. Further, it can be employed for the decolorizing of saccharine juices and the like.

In general, the liquid or gaseous substance to be treated will be brought into contact with the new absorbent catalyzer product, which will perform the duty assigned to it in each case, the material absorbed being recovered by any suitable means if so desired.

As a particular example of carrying out the process for the preparation of the new industrial product, two parts of active carbon, reduced to an impalpable powder, are agglomerated with three parts of saccharose. If the addition of ferric chloride is required, two parts of that salt are added to the mixture. The whole is mixed with sufficient water to yield a paste adapted for moulding into cylinders or granules in a press.

After drying, the masses are coated with a film of suitable thickness, consisting of sugar or saccharose in the form of a syrup, to which there may be added about ten per cent of active carbon, likewise in impalpable powder. The coated masses are then calcined at about 700° C., as above described.

What I claim is:—

1. A novel product, possessing the high absorbent and catalytic power of activated charcoal, composed of an agglomerated mass of active charcoal, covered with a coating of harder but less activated carbon, giving to the product the desirable mechanical strength.

2. A process for carrying out the agglomeration of absorbent or catalytic charcoal by saccharose, the masses agglomerated with the said product being coated with the aid of the same product in such a way as to obtain after calcination an outer coat of carbon of greater hardness which protects them against external mechanical actions.

3. A process for carrying out the agglomeration of absorbent or catalytic charcoal, comprising the steps of reducing the substance to powder, mixing the powdered substance with an organic product capable of being carbonized by heat, moulding the mixture into shaped masses, coating said masses with a film of said organic product, and calcining the coated masses.

4. A process for carrying out the agglomeration of absorbent or catalytic charcoal, comprising the steps of reducing the substance to powder, mixing the powdered substance with saccharose, adding to the mixture a proportion of ferric chloride, warming and moistening the mixture, moulding the mixture while in plastic condition, drying the moulded masses, coating said masses with a film of saccharose, and calcining the coated masses in slightly permeable retorts.

5. The combination of an agglomerated mass obtained by mixing active carbon in the form of a powder with saccharose, with an outer coating obtained by mixing saccharose with a small proportion of active carbon, the whole being calcined to harden said outer coating by converting it into strongly agglomerated carbon.

6. The combination of an agglomerated mass obtained by mixing active carbon in the form of a powder with saccharose, with an outer coating obtained by mixing said active carbon with a larger proportion of saccharose, the whole being calcined to convert said outer coating into strongly agglomerated carbon and the enclosed mass into less strongly agglomerated but still highly active carbon.

In witness whereof I have hereunto affixed my signature.

ALBERT GODEL.